United States Patent [19]

Priola et al.

[11] 4,029,871

[45] June 14, 1977

[54] HIGH MOLECULAR WEIGHT SOLUBLE POLYMERS STARTING FROM POLYCYCLIC POLYENES HAVING TWO CONJUGATED DOUBLE BONDS AND PROCESS FOR PREPARING SAME

[75] Inventors: Aldo Priola; Arnaldo Roggero; Sebastiano Cesca, all of San Donato Milanese, Italy

[73] Assignees: Snam Progetti, S.p.A.; Brevetti e Licenze, both of Milanese, Italy

[22] Filed: June 26, 1975

[21] Appl. No.: 590,574

Related U.S. Application Data

[63] Continuation of Ser. No. 397,793, Sept. 17, 1973, abandoned, which is a continuation of Ser. No. 177,867, Sept. 3, 1971, abandoned.

[30] Foreign Application Priority Data

Sept. 3, 1971 Italy .............................. 29299/71

[52] U.S. Cl. .............................. 526/282; 526/90; 526/185; 526/237
[51] Int. Cl.² .............................. C08F 12/32
[58] Field of Search .............................. 260/93.1, 82.1; 526/282, 90, 185, 237

[56] References Cited

UNITED STATES PATENTS

| | | | |
|---|---|---|---|
| 3,066,123 | 11/1962 | Strohmayer et al. | 260/93.1 |
| 3,299,170 | 1/1967 | Gonzenbach | 260/93.3 X |
| 3,387,046 | 1/1968 | Cleary | 260/93.1 X |

*Primary Examiner*—William F. Hamrock
*Attorney, Agent, or Firm*—Ralph M. Watson

[57] ABSTRACT

A class of soluble polymers of high molecular weight is disclosed whose members are: copolymers of polycyclic polyenes containing two conjugated double bonds which are members of the group consisting of a) polycyclic polyenes having an endomethylenic system orthocondensed with another hydrocarbon ring wherein the two common carbon atoms form a part of a conjugated diene system whose double bonds are located inside the non-endomethylenic ring, b) polyenes presenting an alkylidene group conjugated with a double bond of a ring which forms a part of an endocyclic system, and c) orthocondensed polycyclic polyenes substituted with an alkylidene type ring whose double bond is conjugated with a double bond of one of the cycles; and homopolymers of at least one of said polycyclic polyenes with at least one other conjugated diene. They may be prepared by reacting the selected monomers in the presence of a cationic catalyst selected from the halides of metals of the second to eighth groups of the periodic system and the alkyl derivatives thereof, which may be complexed with water, alcohols, acids, ethers or alkylhalides.

7 Claims, No Drawings

HIGH MOLECULAR WEIGHT SOLUBLE POLYMERS STARTING FROM POLYCYCLIC POLYENES HAVING TWO CONJUGATED DOUBLE BONDS AND PROCESS FOR PREPARING SAME

This is a continuation of application Ser. No. 397,793, filed Sept. 17, 1973, now abandoned; which is a continuation of Ser. No. 177,867, filed Sept. 3, 1971, now abandoned The present invention relates to a new class of polymers consisting of polycyclic polyenes having at least two conjugated double bonds and to the process for preparing same.

More particularly the present invention refers to a new class of homo- and copolymers consisting of polycyclic polyenes having at least two conjugated double bonds selected from one of the following three groups:

a. polycyclic polyenes having an endomethylenic system orthocondensed with another hydrocarbon ring wherein the two common carbon atoms form a part of a conjugated diene system whose double bonds are located inside the -endomethylenic ring;

b. polyenes prosenting an alkylidene group conjugated with a double bond of a ring which forms a part of an endocyclic system;

c. orthocondensed polycyclic polyenes substituted with an alkylidene type ring whose double bond is conjugated with at least a double bond of one of the cycles.

It is known that the above-mentioned polycyclic polyenes, reacted with ethylene and other alpha-olefins in the presence of catalyst systems of the coordinated anionic type, can be used for the preparation of terpolymers which, after vulcanization, yield products which exhibit very good mechanical characteristics.

It has now been found that, when cationic catalysts are used, the above polycyclic polyenes give rise to homopolymers and copolymers between them and with other conjugated dienes, characterized in that they exhibit a high molecular weight as well as an excellent solubility in the usual solvents. Furthermore, the presence of residual unsaturations in the obtained polymers makes them very reactive, particularly suitable, for instance, for after-modification reactions as grafting or cross-linking. Its remarkable reactivity is also exhibited in the possibility of introducing polar groups of the following type: —CN, $SO_3OH$, halogens, —OH, which impart to the molecule particular physical and chemical physical features.

Non-limitative examples of polycyclic polyenes which can be usefully employed according to the invention are listed on the following page. For the polymerization catalyst, systems of the cationic type are used which consist of metal halides belonging to the second to eighth groups of the periodic table or of alkyl derivatives thereof, said compounds being alone or complexed with water, alcohols, acids, ethers or alkylhalides.

Examples of the above compounds are: $BF_3$. $OEt_2$, $TiCl_4$, $Et_2AlCl$, $EtAlCl_2$, $SnCl_4$, $PF_5$, $SbCl_5$, $VCl_4$, $FeCl_3$.

The polymerization reaction is carried out at a temperature comprised between −100° and +20° C and in the presence of a solvent generally selected among aromatic, aliphatic and cycloaliphatic hydrocarbons and chlorinated hydrocarbons.

Other operative conditions will appear from the following examples which are to be understood to be illustrative of the invention but not as limitative thereof:

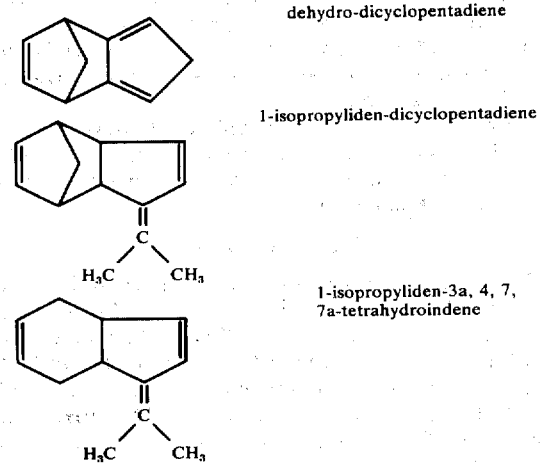

dehydro-dicyclopentadiene 1-isopropyliden-dicyclopentadiene 1-isopropyliden-3a, 4, 7, 7a-tetrahydroindene

EXAMPLE 1

In a 100 ml three-necked flask provided with a mechanical stirrer, thermometer and inlet funnel, 50 ml of anhydrous $CH_2Cl_2$ and 5 ml (30 mmole) of 1-isopropyliden-dicyclopentadiene were introduced. The mixture was cooled down to −80° C and into this solution, kept under stirring, 0.3 mmoles of $BF_3$.OEt diluted in 5 ml of $CH_2Cl_2$ were slowly dropped.

The stirring was continued for 2 hours, then the reaction was stopped by adding 2 ml of cold methanol. The polymeric solution was coagulated in methanol. The polymer was recovered on porous filter plate, washed with methanol and dried for 20 hours at room temperature; 5 g of polymer were obtained (yield = 96%) completely soluble having $[\eta] = 0.82$ dl/g determined in toluene at 30° C.

The mean molecular weight of the sample determined by osmometry was equal to 230,000. The determination of the residual unsaturations by IBr or IC solutions revealed the presence of two double bonds for each monomer unit.

The physico-chemical analysis of the polymer allows to state that the polymerization took place in 1–4 on the conjugated diene system. In fact the IR analysis revealed the presence of an absorption band at 3050 $cm^{-1}$, also present in the monomer and ascribable to the norbornene double bond; the UV analysis revealed the disappearance of the absorption band at 25 $\mu$ present in the monomer and characteristic of the system containing polysubstituted conjugated double bonds. From the NMR analysis a value of 4.9 for the ratio saturated H/unsaturated H in a good agreement with the proposal polymers structure was found.

b. By following the same operative procedures as in the preced test, 5.3 (30 mmoles) of 1-isopropyliden-dicyclopentadiene in 50 ml of $CH_2Cl_2$ were reacted at a temperature of −40° C with 0.3 mmoles of $BF_3$.OEt_2 dissolved in 55 ml of $CH_2Cl_2$. The mixture was stirred for 10 minutes, then the reaction was stopped with 2 ml of cold methanol; 5.1 g of completely soluble polymer were obtained (yield 98%): $[\eta] = 0.28$ dl/gr, $\overline{M} = 69,000$ other characteristics being the same as in the previously described polymer.

EXAMPLE 2

With the same operative conditions the previous test 5.3 ml (30 mmoles) of 1-isopropyliden-dicyclopentadiene were poured in the polymerization flask together with 50 ml of n.heptane at a temperature of −80° C and 0.3 mmoles of $TiCl_4$ were used as promoter dissolved into 5 ml of n.heptane.

After 8 hours, 4.7 g of completely soluble polymer, (yield = 90%) were obtained having $[\eta] = 0.69$ dl/g; $\overline{M}_n = 162,000$, the other characteristics being similar to the ones of Example 1.

EXAMPLE 3

With the same operative procedures as in the previous test, 5.3 ml of 1-isopropyliden-dicyclopentadiene were dissolved into 50 ml of $CH_2Cl_2$ and reacted with 0.15 mmoles of $Et_2AlCl$ at a temperature of −80° C. To the stirred solution 0.3 mmole of tert butyl chloride in 5 ml of $CH_2Cl_2$ was added dropwise. The stirring was continued for 30 minutes, then the reaction was stopped with 2 ml of methanol; 5.1 g of completely soluble polymer (yield − 98%) were obtained, having $[\eta] = 0.50$ dl/g and characteristics similar to the above-mentioned polymer.

EXAMPLE 4

To 5.3 ml of 1-isopropyliden-dicyclopentadiene dissolved into 50 ml of $CH_2Cl_2$ and cooled down to −80° C, 0.3 mmole of $EtAlCl_2$ dissolved into 5 ml of $CH_2Cl_2$ was slowly added, under stirring. The stirring was continued for 1 hour; 5.2 g of completely soluble polymer were obtained (yield = 100%).

EXAMPLE 5

Following the same operative conditions as in the preceding polymerization tests, 5.10 ml (30 mmole) of 1-isopropyliden - 3a, 4, 7, 7a - tetrahydroindene and 50 ml of $CH_2Cl_2$ were poured into a 100 ml flask cooled down to −80° C. To the stirred solution 0.6 mmole of etherate $BF_3$ dissolved into 5 ml of $CH_2CL_2$ was slowly added. The stirring was continued for 15 hours and then the reaction was stopped with 2 ml of cold methanol; 4.65 g of completely soluble polymer were obtained (yield = 93%), having $[\eta] = 0.18$ dl/g. The determination of the residual unsaturations by means of IC or IBr solutions revealed the presence of 2 residual double bonds for each monomer unit.

The physico-chemical analysis of the polymer was in agreement with a polymerization through 1.4 opening of the conjugated diene system. In fact in the polymer the UV absorption typical of the conjugated double bound disappeared while the band of IR absorption at 3030 $cm^{-1}$ remained ascribable to the cyclohexene double bond. Furthermore from the NMR analysis a 4.6 value for the ratio saturated H/unsaturated H was obtained in good agreement with the proposed formula.

EXAMPLE 6

5 cc of a toluene solution, prepared by reacting 0.1 mmole of $Et_2$ AlCl with 0.3 mmole of tert-butylchloride was slowly added under stirring to a 5.1 ml solution of 1-isopropyliden-3a, 4, 7, 7a tetrahydroindene in 50 ml of toluene cooled at −20° C. After 4 hours 4.0 g of polymer (yield = 80%) was obtained having $[\eta] = 0.11$ dl/g and the same characteristics of the preceding polymer.

EXAMPLE 7

Following the same procedure as in the preceding examples, 3.9 g (30 mmoles) of pure dehydrodicyclopentadiene according to gas-chromatrographic analysis and 50 ml of toluene were poured in a 100 ml flask. The mixture was cooled at −80° C, then 0.3 mmole of $TiCl_4$ dissolved into 5 ml of solvent were slowly added to the solution. The stirring was maintained for 2 hours, then the reaction was stopped with 2 ml of cold methanol. After coagulation in methanol, 3.8 g of completely soluble polymer (yield 98%) were obtained having $[\eta] = 0.58$ dl/g.

The physico-chemical analysis of the polymer is in good agreement with a polymerization through 1.4 opening of the conjugated diene system. In fact the UV analysis revealed the absence of the absorption band at 235.7 $\mu$, ascribed to the conjugated double bond. The IR analysis of the polymer revealed The presence of a band at 1553 $cm^{-1}$ which can be ascribed to the norbornene (and norbornadiene) double bond. Furthermore from the NMR analysis a 4.1 value was obtained for the saturated H/unsaturated H ratio in good agreement with the proposed structure.

EXAMPLE 8

0.3 mmole of $EtAlCl_2$ dissolved in 5 cc of toluene were slowly added under stirring to a solution of 3.9 g of dehydrodicyclopentadiene in 50 ml of toluene, cooled down at −90° C. The stirring was continued for 90 minutes, then the reaction was stopped with 2 ml of cold methanol; 3.6 g of soluble polymer (yield = 92%) were obtained having $[\eta] = 0.62$ dl/g. The polymer exhibits the same characteristics as in the previous described examples.

EXAMPLE 9

Following the same operative conditions as in the previous examples, 50 ml of $CH_2Cl_2$ together with 2.65 (15 mmoles) of 1-isopropyliden-dicyclopentadiene as well as 5.1 ml (30 mmoles) of 1-isopropyliden-3a, 4, 7, 7a-tetrahydroindene were poured in a 100 ml flask. The mixture was cooled down to −80° C; then 0.4 mmole of $BF_3.OEt_2$ dissolved in 5 cc of solvent was slowly added to the stirred solution. The stirring was continued for 3 hours, then the reaction was stopped with 2 ml of cold methanol. After coagulation in methanol, 3.1 g of polymer (yield = 42%) were obtained having $[\eta] = 0.30$ dl/g.

The fractionation tests carried out on the obtained polymer showed that it is a true copolymer of 1-isopropylidendicyclopentadiene and 1-isopropyliden 3a, 4, 7, 7a-tetrahydroindene with a content of the first monomer determined by IR analysis equal to 45% in mole.

EXAMPLE 10

Following the above-mentioned procedures, 5.3 ml of 1-isopropyliden-dicyclopentadiene (30 mmoles), 3 ml of isoprene (30 mmoles) and 50 ml of toluene were poured into a 100 ml three-necked flask. The mixture was cooled down to −80° C, then 0.4 mmoles of $TiCl_4$ dissolved in 5 ml of toluene were slowly added under stirring. THe stirring was continued for 1 hour, then the reaction was stopped with 2 ml of cold methanol; 4.5 g of polymer were recovered (yield 63%) having $[\eta] = 0.35$ dl/g. The IR analysis of the sample obtained after fractionation of the polymer revealed the presence of isoprene units (trans 1,4) and units deriving from the 1-isopropyliden-dicyclopentadiene with a content of isoprene of 35% mole.

We claim:

1. Process for the preparation of a soluble polycyclic polyene polymer having residual unsaturation and high molecular weight wherein at least one monomer is 1-isopropylidendicyclopentadiene, said momomer being reacted in the presence of a catalyst system of the cationic type consisting of a halide of an element of the second to the eighth groups of the periodic table or a water alcohol, acid, ether or alkyl halide complex thereof that is selected from the group consisting of $BF_3 \cdot OEt$, $TiCl_4$, $Et_2AlCl$ and $EtAlCl_2$ to form said polycyclic polyene polymer.

2. Process according to claim 1 wherein the reaction is carried out at a temperature in the range between $-100°$ and $+20°$ C.

3. Process according to claim 1 wherein the reaction is carried out in the presence of a solvent selected from the group consisting of aromatic, aliphatic, cycloaliphatic and chlorinated hydrocarbons.

4. A process as defined in claim 1 wherein the halide of an element of the second to the eighth groups of the periodic table is $BF_3\text{-}OEt$.

5. A process as defined in claim 1 wherein the halide of an element of the second to the eighth groups of the periodic table is $TiCl_4$.

6. A process as defined in claim 1 wherein the halide of an element of the second to the eighth groups of the periodic table is $Et_2AlCl$.

7. A process as defined in claim 1 wherein the halide of an element of the second to the eighth groups of the periodic table is $EtAlCl_2$.

* * * * *